(12) United States Patent
Rayalu et al.

(10) Patent No.: US 7,510,659 B2
(45) Date of Patent: Mar. 31, 2009

(54) SURFACE-MODIFIED ZEOLITE AND PROCESS FOR SYNTHESIS THEREOF FOR SEQUESTRATION OF ANIONS

(75) Inventors: Sadhana Suresh Rayalu, Nagpur (IN); Pawan Kumar, Nagpur (IN); Siddharth Ulhas Meshram, Nagpur (IN); Amit Kumar Bansiwal, Nagpur (IN); Nitin Kumar Labhsetwar, Nagpur (IN); Rishi Narayan Singh, Nagpur (IN); Sukumar Devotta, Nagpur (IN)

(73) Assignee: Council of Scientific & Industrial Research, New Delhi (IN)

( * ) Notice: Subject to any disclaimer, the term of this patent is extended or adjusted under 35 U.S.C. 154(b) by 168 days.

(21) Appl. No.: 11/466,636

(22) Filed: Aug. 23, 2006

(65) Prior Publication Data

US 2007/0210006 A1    Sep. 13, 2007

(51) Int. Cl.
*B01J 29/04* (2006.01)
*C02F 1/42* (2006.01)

(52) U.S. Cl. ............ 210/683; 210/684; 210/688; 502/60; 502/62

(58) Field of Classification Search ............ 502/60, 502/62; 210/683, 684, 688
See application file for complete search history.

(56) References Cited

U.S. PATENT DOCUMENTS 5,456,840 A    10/1995  Tucker et al.
6,261,986 B1 *  7/2001  Bowman et al. ............ 502/62
7,309,676 B2 * 12/2007  Mouri et al. ............... 502/60

OTHER PUBLICATIONS

Bowman et al. (2000) "Uptake of Cations, Anions and Nonpolar Organic Molecules by Surfactant-Modified Clinoptilolite-Rich Tuff," In; *Natural Zeolites for the Third Millennium* Colella et al. Eds., De Frede Editore, Naples, Italy, pp. 287-297.

Huang et al. (1989) "Enhancing As(5+) Removal by a Fe(2+)-Treated Activated Carbon," *J. Water Polut. Contr. Fed.* 61(9):1596-1603.

Krishna et al. (2001) "Surfactant-Modified Clay as Adsorbent for Chromate," *Appl. Clay Sci.* 20:65-71.

Li et al. (2001) "Retention of Inorganic Oxyanions by Orhanokaolinite," *Water Res.* 35:3771-3776.

Li et al. (1998) "Sorption of Oxyanions by Surfactant Modified Zeolite," *J. Disp. Sci. Technol.* 19(6-7):843-857.

Li et al. (1999) "Enhanced Reduction of Chromate and PCE by Pelletized Surfactant-Modified Zeolite/zerovalent Iron," *Environ. Sci. Technol.* 33:4326-4330.

Vujaković et al. (Nov. 2000) "The adsorption of Sulphate, Hydrogenchromate and Dihydrogenphosphate Anions on Surfactant-Modified Clinoptilolite," *Appl. Clay Sci.* 17(5-6):265-277.

* cited by examiner

*Primary Examiner*—Chester T Barry
(74) *Attorney, Agent, or Firm*—Greenlee, Winner and Sullivan, P.C.

(57) ABSTRACT

Present invention deals with cost-effective surface-modified zeolite materials developed from commercial zeolites and flyash-based zeolites by treating with surface modifiers like hexadecyltrimethyl ammonium bromide (HDTMA-Br). The formation of zeolitic materials with anionic characteristics requires treatment with a surfactant with initial concentrations greater than its critical micelle concentration (CMC). The sorption of oxyanions on the surfactant-modified zeolite (SMZ) is attributed to surface complexation and surface precipitation. Incorporation of metal ions on SMZ showed improved anion uptake for dearsenification of water due to synergistic effects and is able to meet the stringent target of 10 ppb of As on potable water being adopted by most countries. High selectivity, faster kinetics and high adsorption capacity ensures cost effectiveness of this product as compared to other low-cost products for dearsenification. Zeolite analogues with anionic characteristics have been developed for their applications for removal of arsenic from water. The material developed can also be used to remove other anions like chromium and selenium.

14 Claims, No Drawings

SURFACE-MODIFIED ZEOLITE AND PROCESS FOR SYNTHESIS THEREOF FOR SEQUESTRATION OF ANIONS

CROSS-REFERENCE TO RELATED APPLICATIONS

This application claims priority to Indian Patent Application No. 0646/DEL/2006 filed on Mar. 10, 2006, the disclosure of which is incorporated herein by reference to the extent not inconsistent herewith.

FIELD OF THE INVENTION

The present invention relates to a surface-modified zeolite. Further, it relates to a process for synthesis of surface-modified zeolites for sequestration of anions. More particularly, it relates to a process for removal of toxic elements from water using surface-modified zeolite and recovering of the said surface-modified zeolite.

BACKGROUND OF THE INVENTION

In the backdrop of the widespread public concern about vast sections of Population, e.g., in West-Bengal (India) and Bangladesh, being potentially exposed to consumption of ground water containing high concentrations of arsenic, the urgency for delineating an appropriate treatment strategy for arsenic removal is realized to overcome the grave threat of chronic arsenic poisoning. Recent epidemiogical evidence of the toxicity of inorganic arsenic suggests that the current maximum contaminant level (MCL) may not be sufficiently protective for human health; the probable WHO guideline value of 10 µg/L is based on both estimated health risks and the practical quantitation level. The estimated cost of compliance with more stringent levels (in the range 2-20 µg/L) is quite high. The existing treatment technologies, such as coagulation, softening, and adsorption on alumina or activated carbon and reverse osmosis accomplish arsenic removal to meet the current standard of 50 µg/L. However, imposition of low arsenic MCL is likely to require implementation of new treatment practices or significant modification of the existing treatment practices. It needs to be emphasized that only a few de-arsenification technologies in vogue have been successfully demonstrated in the field. To achieve this stringent target, novel materials need to be developed wherein zeolites are emerging as potential materials, which can be suitably functionalised to target specific pollutants of concern. Zeolites can be best defined as hydrated crystalline, alumino-silicates with uniform pore size, reversible hydration, ion-exchanging sorptive, and sieving ability. These characteristics are to be exploited for targeting anions in specific arsenate/arsenite ion. It is really challenging to tackle anionic pollutants using functionalised faujasitic zeolites and has been achieved by modifying the surface of the zeolites to selectively target anion.

Reference may be made to Li, Zhaohui, et al. (2000) wherein they studied the removal of oxyanions viz. nitrate, arsenate, chromate, etc. using surface-modified clay. Natural kaolinite was treated with hexadecyltrimethylammonium bromide (HDTMA-Br) to a level twice than that of the cation exchange capacity (CEC). Sorption of each oxyanions was well described by the Langmuir isotherm. Desorption of bromide counter ion indicated that each of the oxyanions was retained by ion exchange on HDTMABr bilayer formed on the organo-kaolinite. It was unaffected by solution in the pH range of 5-9, but at pH 11 the bilayer was affected due to competition of OH⁻ for the anion exchange sites. The results demonstrated that properly prepared organoclays could remove oxyanions as well as non-polar organics, from contaminated water.

Reference may be made to Krishana et al. (2001) wherein adsorption of chromate by surface-modified clays like kaolinite and montomorillinonite modified with cationic surfactant hexadecyltrimethylammonium bromide was reported. It was observed that the amount of chromate absorbed is dependent on pH and that the removal goes on decreasing with increasing pH and it becomes negligible over pH 8 (23). Clays also have the inherent disadvantage of swelling and shrinkage associated with them and therefore cannot be used effectively for treatment purposes.

Reference may also be made to Li et al. (1998) wherein it has been reported that planar nitrate sorbs more on surfactant-modified zeolite surface than tetrahedral chromate. In the presence of sulphate or nitrate, chromate sorption is hindered due to competition or sorption sites, quantitative sorption of nitrate and chromate and desorption of bromide indicate that the sorption of oxyanions is primarily due to surface anion exchange. However, the material has limited exchange potential due to limited exchange capacity of the natural zeolite.

Reference may be made to Tucker et al. (1995) wherein a method for removing anions from water is provided, wherein a complexing agent such as a cationic polyelectrolyte is added to unreacted water. The cationic polyelectrolyte complexes with anions, such as chromate and are filtered. The complex is then treated with a regeneration agent, such as barium chloride or lead chloride to precipitate ions and to regenerate complexing agent, which can be reused for water treatment. However, the method faces difficulty in its practical application for drinking water wherein the requirement of an ultra filtration membrane to retain the retention complex and then regeneration of the same makes the process tedious and expensive.

Reference may be made to Hamann et al. (1994) wherein coagulation and lime softening was reported extensively for the removal of arsenic. Adsorption-coprecipitation with hydrolysing metals such as $Al^{3+}$ and $Fe^{3+}$ is the most commonly used treatment technique for removing arsenic from water. Iron coagulation achieves high As (III) and As (V) removal than alum coagulation. This mode of treatment generates sludge, disposal of which, in turn maybe a problem.

Willey (1987) studied the use of treatment processes such as reverse osmosis (RO), ion exchange, adsorption or electrodialysis. These methods are quite expensive for usage in domestic purposes.

Reference may be made to Huang et al. (1989) wherein arsenic removal by adsorption has also been evaluated extensively. It was reported therein that activated carbon adsorption was not effective for the removal of arsenic, but pre-treatment of activated carbon with iron salts has been shown to improve the sorption capacity of arsenic. This method suffers form drawback of having lower and limited loading of iron, which in turns decreases, the adsorption capacity.

Reference may be made to Bowman et al. (1998) wherein the uptake of the surfactants hexadecyltrimethylammonium bromide (HDTMA-Br) by a natural clinoptilolite rich zeolite and subsequent retention of aqueous solutes was studied. SMZ has shown weak sorption capacity for cations such as Pb(II), Sr(II), and strong sorption for anions such as $CrO_4^{2-}$. This is in contrast to the natural zeolite, which are good cation exchangers. The results suggested formation of stable HDT-MABr bilayer on the external surface of zeolite, which retained anions via anion exchange mechanism. SMZ thus proved to be a useful sorbent for anion removal. However, natural zeolite by virtue of its low exchange capacity and other impurities associated, sorbs anion to a lower degree, which can be improved by using synthetic zeolites.

Reference may be made to Alkesaddra et al. (2000) wherein adsorption of sulphate, hydrochromate, and dihydrogen phosphate, anions on the surfactant-modified clinoptilolite was studied. The SMZ was prepared by the adsorption of cis-1 aminooctaden-9 (oleyamine) on both modified and unmodified natural clinoptilolite. It was observed that oleyamine adsorbed on $H^+$-clinoptiolite by protonation of $NH_2$ group has shown strong anion adsorbing tendency as compared to Ca and Na-clinoptilolite derivatives, which are weak anion adsorbents. The differences in anion adsorption are attributed to the fact that oleylamine forms hydrogen bonding with Ca and Na-clinoptilolite and thus yields insufficient adsorption sites for anions.

Reference may be made to U.S. Pat. No. 6,326,326, (Dec. 4, 2001) Feng et al. wherein, they developed an organized assembly of functional molecules with specific interfacial functionality (functional group(s)) was attached to available surfaces including within mesopores of a mesoporous material. The method of which the present invention avoids the standard base soak that would digest the walls between the mesopores by boiling the mesoporous material in water for surface preparation then removing all but one or two layers of water molecules on the internal surface of a pore. Suitable functional molecule precursor is then applied to permeate the hydrated pores and the precursor then undergoes condensation to form the functional molecules on the interior surface(s) of the pore(s). These materials are reported to perform at very low concentration and have high adsorption capacity.

Reference may be made to U.S. Pat. No. 5,833,739, (Nov. 10, 1998) wherein, Klatte, et al. developed a process for coating zeolite crystals with paraffin, a wax other than paraffin, a fat or oil, or a mixture of at least one QAC and a wax, fat, or oil was reported. Preferably, the crystals were dehydrated until they have about 5% moisture content, and were then mixed with paraffin to produce paraffin-coated zeolite crystals having a desired content of paraffin. Zeolite crystal having pores coated with wax, fat, oil, or a mixture of at least one QAC and wax, fat, or oil is positively charged and has tendency to attract anions. The coating of paraffin/wax applied to zeolite crystal prior to adsorption of QAC may limit its application for removal of anions; in specific, arsenic from drinking water.

Reference may be made to Zhaohui Li et al. (1999) wherein, Natural zeolite and ZVI were homogenized and pelletized to maintain favourable hydraulic properties while minimizing materials segregation due to bulk density difference. The zeolite/ZVI pellets were modified with the cationic surfactants hexadecyltrimethyl ammonium bromide to increase contaminant sorption and thus the contaminant concentration on the solid surface. Results of chromate sorption/reduction indicate that the chromate sorption capacity of palletised SMZ/ZVI is at least 1 order of magnitude higher than that of zeolite/ZVI pellets.

The SMZ material developed in the present invention overcomes the following drawbacks of the conventional materials in vogue:

Lack of selectivity of conventional adsorbents for arsenic at low concentrations Lack of versatility of conventional for adsorbents for sorption of wide range of pollutants ranging from cationic to anionic Limited efficiency of conventional adsorbent Frequent regeneration and disposal by virtue of its possible conversion to value added ceramic precursors by heat treatment Transfer of arsenic by stabilization of SMZ at higher temperature Cost-effectiveness of other adsorbents by offering single unit for wide array of pollutants vis-à-vis multiple units required for targeting wide array of pollutants Sludge generation associated with conventional chemical method viz. alum treatment, chemical precipitation etc.

Hazardous chemical handling etc. by providing technically non-tedious and clean process.

Improvisation in quality of life vis-à-vis improved quality of water.

OBJECTS OF THE INVENTION

The main object of the present invention is to provide surface-modified zeolites.

Another object of the present invention is to provide a process for synthesis of surface-modified zeolites for sequestration of anions.

Yet another object of the present invention is to provide a process for removal of toxic elements from water using surface-modified zeolite and recovering of the said surface-modified zeolite.

Still another object of the present invention is to provide a process for removal of toxic elements such as chromate, arsenate and selenate from water using a surface-modified zeolite.

DETAILED DESCRIPTION OF THE INVENTION

Accordingly, the present invention provides a surface-modified zeolite comprising:

a) a zeolite selected from the group consisting of zeolite A, zeolite X, flyash-based zeolite, and faujasitic zeolite of Y type;

b) a modifier selected from the group consisting of surfactants and metal chelating ligands; and c) iron wherein the ratio of zeolite:modifier:iron in said modified zeolite ranges from 1:0.003:0.25 to 1:0.045:25.

In an embodiment of the present invention, the surfactant used is selected from the group of hexamdecyltrimethyl ammonium bromide (HDTMA-Br), sodium lauryl sulphate and other related compounds.

In another embodiment of the present invention, the surface modifier used is selected from the group of tetrapropoylammonium bromide (TPA-Br), tetrabutylammonium bromide (TBA-Br), tetramethylammonium bromide (TMA-Br) and related compounds.

In further another embodiment of the present invention, the metal chelating ligands used is selected from the group of dimercaptosuccinic acid (DMSA), dimercaptopropionic acid and related compounds.

In yet another embodiment of the present invention, the surface-modified zeolite synthesized has the following characteristics:

calcium binding capacity: 400 meq/100 g surface area: 500 $m^2/g$ crystallinity: 90-92% cubic crystal structure $d_{50}$ average particle size of 4-10μ

Further, the present invention also provides a process for the synthesis of surface-modified zeolites useful for sequestration of anions, wherein the said process comprising the steps of:
a) washing the zeolite selected from the group of zeolite A, zeolite X, flyash based zeolite, faujasitic zeolite of Y type etc. with distilled water followed by post modification using one of the modifiers selected from the group of surfactant, surface modifier or metal chelating ligand by mixing and stirring of zeolite and modifier for 6-8 hr at pH 6.0 to pH 11.0;
b) filtering and washing the product obtained from step (a);
c) drying the product obtained from step (b) at 90-100° C. for 2-3 hr to obtain surface-modified zeolite materials;
d) filtering the surface-modified zeolite materials obtained from step (c) to get surface-modified zeolite crystals or optionally subjecting the surface-modified zeolite to treatment with iron to get surface-modified zeolite crystals.

In an embodiment of the present invention, the surface-modified zeolite synthesized has the following characteristics:
calcium binding capacity: 400 meq/100 g
surface area: 500 m$^2$/g
crystallinity: 90-92%
cubic crystal structure
$d_{50}$ average particle size of 4-10μ

In another embodiment of the present invention, the surfactant used is selected from the group of hexamdecyltrimethyl ammonium bromide (HDTMA-Br), sodium lauryl sulphate, and other related compounds.

In further another embodiment of the present invention, faujasitic zeolites of A & Y type is used for post modification using surfactants.

In yet another embodiment of the present invention faujasitic zeolite of A-type is post treated with surfactant viz. Hexadecyltrimethyl ammonium bromide (HDTMA-Br) to synthesize surface-modified zeolite (SMZ-A).

In still another embodiment of the present invention, faujasitic zeolite of Y type is post treated with surfactant viz. HDTMA-Br to synthesis surface-modified zeolite (SMZ-Y).

In still another embodiment of the present invention, the surface modifiers are selected from the group of tetrapropoylammonium bromide (TPA-Br), tetrabutylammonium bromide (TBA-Br), tetramethylammonium bromide (TMA-Br) and related compounds.

In still another embodiment of the present invention, zeolite of Y and A type were subjected to different other surface modifiers like quaternary ammonium compounds viz. TPA-Br, TBA-Br.

In still another embodiment of the present invention, the metal chelating ligands used is selected from the group of dimercaptosuccinic acid (DMSA), dimercaptopropionic acid and related compounds.

In still another embodiment of the present invention, zeolite of Y and A type were subjected to metal chelating ligands viz; Dimercaptosucinnic acid, dimercaptopropoionic acid.

In still another embodiment of the present invention, the concentration of surfactant, surface modifier, and metal chelating ligand is in the range from 200 mg/l to 2,000 mg/l.

In still another embodiment of the present invention, the iron treatment is carried out by using ferrous sulphate solution in the concentration ranges from 0.1 to 1.0M.

In still another embodiment of the present invention, SMZs were thoroughly characterized to study their structural and thermal stability using XRD, SEM, and particle size analysis.

Further, the present invention also provides a method for removal of anionic pollutants from water using surface-modified zeolite and recovery of the said surface-modified zeolite, wherein the said method comprising the steps of:
a) contacting anionic pollutants containing water with surface-modified zeolite for 0-10 minutes;
b) subjecting the anionic pollutants sorbed surface-modified zeolite obtained from step (a) to high temperature treatment at 700-800 degree C. for its conversion into ceramic precursors or optionally recovering the surface-modified zeolite by using caustic soda solution.

In an embodiment of the present invention, the simulated water containing anionic pollutants is prepared by dissolving sodium salt of arsenate and chromate.

In another embodiment of the present invention, the said pollutants are selected from the group of chromate, arsenate and selenate.

In further another embodiment of the present invention, the concentration of said pollutants arsenate is in the range of 1-150 mg/l.

In yet another embodiment of the present invention, the concentration of arsenate is in the range of 1-150 mg/l.

In still another embodiment of the present invention, the concentration of chromate is in the range of 1-100 mg/l.

In still another embodiment of the present invention, the surface-modified zeolite used for the removal of said pollutants in the range of 0.2-125/25 ml.

In still another embodiment of the present invention, the 0.1-1M caustic soda solution used for recovery of said surface-modified zeolite is in the range.

Surface-modified zeolite (SMZ) materials have been developed from zeolite, which are being used for targeting a wide array of pollutants ranging from cationic to anionic components. The need for this kind of versatile materials for environmental remediation is being realized, wherein, the commercially available zeolites are finding restricted usage due to prohibitive costs for tackling individual pollutants. To overcome this problem, a process for SMZ has been developed which can be exploited for a wide array of pollutants thus overcoming the cost implications of tackling individual pollutants. It is of immense practical importance to develop materials with tailored properties to sequester anionic pollutants in addition to cationic pollutants. Zeolites are aluminosilicate materials with properties to attract positive charged ions and, therefore, are widely used for sequestration of cationic pollutants like lead, cadmium and also ammonium ion, generally through ion-exchange process. The first step towards synthesis of SMZs is surface treatment to modify the surface chemistry of zeolite through a simple process of surface modification using surfactant and quaternary ammonium compounds. Treatment of zeolites with surfactant concentration less than critical micelle concentration (CMC) results in the formation of SMZ with hydrophobic characteristics whereas treatment of zeolites with surfactant concentration greater than its CMC renders anionic characteristic to the SMZ. These anionic SMZ have been given an additional treatment with $FeSO_4$ solution to incorporate iron for synergistic effect not reported so far to the best of our knowledge. Treatment of zeolite with mercapto-compounds results in the materials with enhanced selectivity and affinity. This material has not been reported so far to the best of our knowledge. The development of such innovative, versatile materials is expected to bring out revolutionary changes in the area of water and waste water treatment by offering a single unit vis-à-vis multiple units required for treatment of waste, which are generally multi component.

In the present invention, it is proposed to overcome the major problem of arsenic removal by developing new materials to attain the stringent target of 10 ppb and offering cost attractive alternative to conventional methods and materials. Faujasitic zeolites are basically cation exchangers and hydrophilic in nature and cannot be used for targeting anions. This challenge is to be met by modifying the surface of the zeolites by treating it with surface modifiers like surfactants and quaternary ammonium and mercapto compounds. The SMZ with increased loading results in the formation of bilayer, which has an affinity for anionic compounds.

Synthesis of Surface-Modified Zeolite

Zeolite was washed with distilled water several times till its pH reaches to 10.0 to 10.5. Pre-weighed quantity of washed zeolite sample was then mixed with different initial concentration of surfactant i.e. hexadecyltrimethyl ammonium bromide solution in 1:100 (solid:liquid) ratio. The surfactant concentration was ranging from 100 mg/l to 800 mg/l for 10 g of zeolite. The solution was agitated for 7 to 8 hr at 150 rpm on a shaker at pH 8.0 to 8.5. The solution was then filtered and the solid residue was washed with double distilled water and air dried for 4 to 6 hr. The SMZ-A sample synthesized as such was then mechanically ground with a mortar and pestle to fine particle size. Surface-modified zeolite having variable surfactant loading was then used for removal of arsenic. The same procedure was repeated for modification of surface zeolite-A/X samples as above for comparative studies. The different surface-modified zeolites having different surfactant loading was then used for removal of arsenic in water.

Synthesis of Metal Treated Surface-Modified Zeolite

Zeolite A was washed with distilled water several times till its pH reaches to 10.0 to 10.5. Pre weighed quantity of washed zeolite A sample was then mixed with different initial concentration of surfactant i.e. hexadecyltrimethyl ammonium bromide (HDTMA-Br) solution in 1:100 (solid : liquid) ratio. The surfactant concentration was ranging from 100 mg/l to 800 mg/l for 10 g of zeolite A. The solution was agitated for 7 to 8 hr at 150 rpm on a shaker at pH 8.0 to 8.5. The solution was then filtered and the solid residue was washed with double distilled water and air dried for 6hr. The SMZ-A sample synthesized as such was then mechanically ground with a mortar and pestle to fine particle size. The metal treatment was given by stirring the SMZ-A in varying quantities of $FeSO_4$ solution (0.1-0.5 M) for 24 hours.

Conversion to Ceramic Precursors

Zeolite used for sorption of arsenate was separated and dried at 100° C. The dried mass was heated up to 300° C. The heated mass was cooled and crushed. It was then subjected to heating up to 800° C. The sintered mass was subjected to TCLP test for leaching of As and was dissolved in hydrochloric acid to monitor the As content.

Methods of Analysis

Pre-weighted quantity of surface-modified zeolite was mixed with 25 ml of solution of arsenic with concentration ranging from 1-5 mg/l of variable initial concentration. The pH was maintained at about 6.5 to 7.0 by the addition of dilute HCl. The mixture was then shaken on shaker at 150 rpm and filtered. The filtrate was analysed for arsenic using AAS and ICP-AES.

Characterization

SMZ-A, which appears to be suitable for removal of anions, has been characterized with respect to crystallinity, particle size and morphological characteristics. The morphological characteristics of Zeolite-A also appear to be different from that of SMZ-A (P.1) indicating sorption of surfactant. XRD patterns of zeolite-SMZ-A are less in comparison with FAZ-A.

Present invention is applicable to the preparation of a very large species of materials since there are more than 140 zeolite crystal structures and large number of surface modifying agents.

The following examples are given by way of illustration of the present invention and should not be construed to limit the scope of present invention.

EXAMPLE 1

Zeolite-A was washed with distilled water several times till its filtrate pH reaches to 10.0 to 10.5. 10 g of washed zeolite A sample was then mixed with surfactant i.e. hexadecyltrimethyl ammonium bromide solution in 1:100 (solid:liquid) ratio. The surfactant concentration was 100 mg/l. The sample was designated as SMZ-1. The solution was agitated for 7 to 8 hr at 150 rpm on shaker at pH 8.0 to 8.5. The solution was then filtered and the solid residue was washed with double distilled water and air dried for 6 hr. The SMZ-A sample synthesized as such was then mechanically ground with a mortar and pestle to fine particle size. The powdered SMZ-A was used for adsorption of arsenic. The efficiency of sample is illustrated in Table 1.

TABLE 1

Arsenic removal using SMZ-A (HDTMA-Br)
Contact time: 1 hr Dose: 5 g/l

| S. No. | SMZ-A | Concentration of surfactant mg/l | Initial concentration of As mg/l | Final concentration of As mg/l | % Removal |
|---|---|---|---|---|---|
| 1 | SMZ-A-1 | 100 | 1.15 | 0.676 | 41.21 |
| 2 | SMZ-A-2 | 200 | 1.15 | 0.614 | 46.60 |
| 3 | SMZ-A-3 | 300 | 1.15 | 0.504 | 56.71 |
| 4 | SMZ-A-4 | 500 | 1.15 | 0.718 | 37.56 |
| 5 | SMZ-A-5 | 800 | 1.15 | 0.203 | 82.34 |
| 6 | SMZ-A-6 | 1000 | 1.15 | 0.482 | 58.06 |
| 7 | SMZ-A-7 | 1200 | 1.15 | 0.640 | 44.80 |
| 8 | SMZ-A-8 | 1500 | 1.15 | 0.625 | 45.65 |
| 9 | SMZ-A-9 | 1800 | 1.15 | 0.549 | 52.26 |
| 10 | SMZ-A-10 | 2000 | 1.15 | 0.398 | 65.39 |
| 11 | SMZ-A-11 | 2200 | 1.15 | 0.527 | 54.17 |
| 12 | SMZ-A-12 | 2500 | 1.15 | 0.630 | 45.21 |

EXAMPLE 1a

The same procedure was repeated as described in example 1 except for variation in treatment with surfactant wherein the concentration employed was 200 mg/l. The sample was designated as SMZ-2. The powdered SMZ-A was used for adsorption of arsenic. The efficiency of sample is illustrated in Table 1.

EXAMPLE 1b

The same procedure was repeated as described in example 1 except for variation in treatment with surfactant wherein the concentration employed was 300 mg/l. The sample was designated as SMZ-3. The powdered SMZ-A was used for adsorption of arsenic. The efficiency of sample is illustrated in Table 1.

EXAMPLE 1c

The same procedure was repeated as described in example 1 except for variation in treatment with surfactant wherein the concentration employed was 500 mg/l. The sample was designated as SMZ-4. The powdered SMZ-A was used for adsorption of arsenic. The efficiency of sample is illustrated in Table 1.

EXAMPLE 1d

The same procedure was repeated as described in example 1 except for variation in treatment with surfactant wherein the concentration employed was 800 mg/l. The sample was designated as SMZ-5. The powdered SMZ-A was used for adsorption of arsenic. The efficiency of sample is illustrated in Table 1.

EXAMPLE 1e

The same procedure was repeated as described in example 1 except for variation in treatment with surfactant wherein the concentration employed was 1000 mg/l. The sample was designated as SMZ-6. The powdered SMZ-A was used for adsorption of arsenic. The efficiency of sample is illustrated in Table 1.

EXAMPLE 1f

The same procedure was repeated as described in example 1 except for variation in treatment with surfactant wherein the concentration employed was 1200 mg/l. The sample was designated as SMZ-7. The powdered SMZ-A was used for adsorption of arsenic. The efficiency of sample is illustrated in Table 1.

EXAMPLE 1g

The same procedure was repeated as described in example 1 except for variation in treatment with surfactant wherein the concentration employed was 1500 mg/l. The sample was designated as SMZ-8. The powdered SMZ-A was used for adsorption of arsenic. The efficiency of sample is illustrated in Table 1.

EXAMPLE 1h

The same procedure was repeated as described in example 1 except for variation in treatment with surfactant wherein the concentration employed was 1800 mg/l. The sample was designated as SMZ-9. The powdered SMZ-A was used for adsorption of arsenic. The efficiency of sample is illustrated in Table 1.

EXAMPLE 1i

The same procedure was repeated as described in example 1 except for variation in treatment with surfactant wherein the concentration employed was 2000 mg/l. The sample was designated as SMZ-10. The powdered SMZ-A was used for adsorption of arsenic. The efficiency of sample is illustrated in Table 1.

EXAMPLE 1j

The same procedure was repeated as described in example 1 except for variation in treatment with surfactant wherein the concentration employed was 2200 mg/l. The sample was designated as SMZ-11. The powdered SMZ-A was used for adsorption of arsenic. The efficiency of sample is illustrated in Table 1.

EXAMPLE 1k

The same procedure was repeated as described in example 1 except for variation in treatment with surfactant wherein the concentration employed was 2500 mg/l. The sample was designated as SMZ-12. The powdered SMZ-A was used for adsorption of arsenic. The efficiency of sample is illustrated in Table 1

EXAMPLE 2

Zeolite A was washed with distilled water several times till pH of the filtrate is 10.0 to 10.5. 10 g of washed zeolite A sample was then mixed with quaternary ammonium compounds (QAC) solution in 1:100 (solid:liquid) ratio. The QAC concentration was 100 mg/l. The solution was agitated for 7 to 8 hr at 150 rpm on gyratory shaker at pH 8.0 to 8.5. The solution was then filtered and the solid residue was washed with double distilled water and air dried for 6 hr. The sample was designated as SMZ-13. The SMZ-A sample synthesized as such was then mechanically ground with a mortar and pestle to fine particle size. The powdered SMZ-A was used for adsorption of arsenic. The efficiency of sample is illustrated in Table 2.

TABLE 2

Arsenic removal using SMZ-A (TBA-Br)
Contact time: 1 hr Dose: 5 g/l

| S. No. | SMZ-A | Concentration of surfactant mg/l | Initial concentration Of As mg/l | Final concentration of As mg/l | % Removal |
|---|---|---|---|---|---|
| 1 | SMZ-A-13 | 100 | 1.05 | 0.88 | 91.61 |
| 2 | SMZ-A-14 | 200 | 1.05 | 0.247 | 76.47 |
| 3 | SMZ-A-15 | 300 | 1.05 | 0.592 | 43.61 |
| 4 | SMZ-A-16 | 500 | 1.05 | 0.763 | 27.33 |
| 5 | SMZ-A-17 | 800 | 1.05 | 0.847 | 19.33 |
| 6 | SMZ-A-18 | 1000 | 1.05 | 0.985 | 6.19 |
| 7 | SMZ-A-19 | 1200 | 1.05 | 0.541 | 48.47 |
| 8 | SMZ-A-20 | 1500 | 1.05 | 0.678 | 35.42 |
| 9 | SMZ-A-21 | 1800 | 1.05 | 0.559 | 46.76 |
| 10 | SMZ-A-22 | 2000 | 1.05 | 0.396 | 62.28 |
| 11 | SMZ-A-23 | 2200 | 1.05 | 0.414 | 60.57 |
| 12 | SMZ-A-24 | 2500 | 1.05 | 0.549 | 47.71 |

EXAMPLE 2a

The same procedure was repeated as described in example 2 except for variation in treatment with QAC wherein the concentration employed was 200 mg/l. The sample was designated as SMZ-14. The powdered SMZ-A was used for adsorption of arsenic. The efficiency of sample is illustrated in Table 2.

EXAMPLE 2b

The same procedure was repeated as described in example 2 except for variation in treatment with QAC wherein the concentration employed was 300 mg/l. The sample was designated as SMZ-15. The powdered SMZ-A was used for adsorption of arsenic. The efficiency of sample is illustrated in Table 2.

EXAMPLE 2c

The same procedure was repeated as described in example 2 except for variation in treatment with QAC wherein the concentration employed was 500 mg/l. The sample was designated as SMZ-16. The powdered SMZ-A was used for adsorption of arsenic. The efficiency of sample is illustrated in Table 2.

EXAMPLE 2d

The same procedure was repeated as described in example 2 except for variation in treatment with QAC wherein the concentration employed was 800 mg/l. The sample was designated as SMZ-17. The powdered SMZ-A was used for adsorption of arsenic. The efficiency of sample is illustrated in Table 2.

EXAMPLE 2e

The same procedure was repeated as described in example 2 except for variation in treatment with QAC wherein the concentration employed was 1000 mg/l. The sample was designated as SMZ-18. The powdered SMZ-A was used for adsorption of arsenic. The efficiency of sample is illustrated in Table 2.

EXAMPLE 2f

The same procedure was repeated as described in example 2 except for variation in treatment with QAC wherein the concentration employed was 1200 mg/l. The sample was designated as SMZ-19. The powdered SMZ-A was used for adsorption of arsenic. The efficiency of sample is illustrated in Table 2.

EXAMPLE 2g

The same procedure was repeated as described in example 2 except for variation in treatment with QAC wherein the concentration employed was 1500 mg/l. The sample was designated as SMZ-20. The powdered SMZ-A was used for adsorption of arsenic. The efficiency of sample is illustrated in Table 2.

EXAMPLE 2h

The same procedure was repeated as described in example 2 except for variation in treatment with QAC wherein the concentration employed was 1800 mg/l. The sample was designated as SMZ-21. The powdered SMZ-A was used for adsorption of arsenic. The efficiency of sample is illustrated in Table 2.

EXAMPLE 2i

The same procedure was repeated as described in example 2 except for variation in treatment with QAC wherein the concentration employed was 2000 mg/l. The sample was designated as SMZ-22. The powdered SMZ-A was used for adsorption of arsenic. The efficiency of sample is illustrated in Table 2.

EXAMPLE 2j

The same procedure was repeated as described in example 2 except for variation in treatment with QAC wherein the concentration employed was 2200 mg/l. The sample was designated as SMZ-23. The powdered SMZ-A was used for adsorption of arsenic. The efficiency of sample is illustrated in Table 2.

EXAMPLE 2k

The same procedure was repeated as described in example 2 except for variation in treatment with QAC wherein the concentration employed was 2500 mg/l. The sample was designated as SMZ-24. The powdered SMZ-A was used for adsorption of arsenic. The efficiency of sample is illustrated in Table 2.

EXAMPLE 3

The same procedure was repeated as described in example 1 for preparation of SMZ-A-5. The as-synthesized SMZ-A-5 was then used for removal of arsenic at initial concentration of 5.0 mg/l. The results are detailed in Table 3.

TABLE 3

Removal of As at Fixed Initial Concentration & Variable SMZ-dose

| S. No. | Dose (g/l) | Contact time (min) | Initial concentration of As mg/l | Final concentration of As mg/l | % Removal |
|---|---|---|---|---|---|
| 1 | 4.0 | 10 | 5.0 | 4.45 | 10.92 |
| 2 | 8.0 | 10 | 5.0 | 4.09 | 18.20 |
| 3 | 12.0 | 10 | 5.0 | 3.55 | 29.00 |
| 4 | 16.0 | 10 | 5.0 | 2.71 | 45.80 |
| 5 | 20.0 | 10 | 5.0 | 1.10 | 77.90 |

EXAMPLE 3a

The same procedure was repeated as described in example 3 except for initial concentration of arsenic solution wherein the concentration employed was 10 mg/l. The results are detailed in Table 3a.

TABLE 3a

Removal of As at fixed initial concentration and at variable SMZ doses

| S. No. | Dose (g/l) | Contact time (min) | Initial concentration of As mg/l | Final concentration of As mg/l | % Removal |
|---|---|---|---|---|---|
| 1 | 4.0 | 10 | 10.0 | 5.50 | 45.0 |
| 2 | 8.0 | 10 | 10.0 | 4.99 | 50.1 |
| 3 | 12.0 | 10 | 10.0 | 3.37 | 66.3 |
| 4 | 16.0 | 10 | 10.0 | 2.46 | 75.3 |
| 5 | 20.0 | 10 | 10.0 | 1.52 | 84.8 |

EXAMPLE 3b

The same procedure was repeated as described in example 3 except for the initial concentration of arsenic solution wherein the concentration employed was 25 mg/l. The results are detailed in Table 3b.

TABLE 3b

Removal of As at fixed initial concentration and at variable doses

| S. No. | Dose (g/l) | Contact time (min) | Initial concentration of As mg/l | Final concentration of As mg/l | % Removal |
|---|---|---|---|---|---|
| 1 | 4.0 | 10 | 25.0 | 20.52 | 17.92 |
| 2 | 8.0 | 10 | 25.0 | 17.73 | 29.08 |
| 3 | 12.0 | 10 | 25.0 | 15.28 | 38.88 |
| 4 | 16.0 | 10 | 25.0 | 12.67 | 49.32 |
| 5 | 20.0 | 10 | 25.0 | 9.97 | 60.12 |

EXAMPLE 4

The same procedure was repeated as described in example 1 for preparation of SMZ-A-5. The as-synthesised SMZ-A-5 was then used for removal of chromate at initial concentration of 5.0 mg/l. The results are detailed in Table 4.

TABLE 4

Removal of $CrO_4^{2-}$ at fixed initial concentration and at variable SMZ dose

| S. No. | Dose (g/l) | Contact time (min) | Initial concentration of As mg/l | Final concentration of As mg/l | % Removal |
|---|---|---|---|---|---|
| 1 | 4.0 | 10 | 5.0 | 3.81 | 23.80 |
| 2 | 8.0 | 10 | 5.0 | 3.42 | 31.60 |
| 3 | 12.0 | 10 | 5.0 | 3.00 | 40.00 |
| 4 | 16.0 | 10 | 5.0 | 2.60 | 48.00 |
| 5 | 20.0 | 10 | 5.0 | 2.00 | 60.00 |

EXAMPLE 4a

The same procedure was repeated as described in example 4 except for initial concentration of arsenic solution wherein the concentration employed was 10 mg/l. The results are detailed in Table 4a.

TABLE 4a

Removal of $CrO_4^{2-}$ at fixed initial concentration and at variable SMZ dose

| S. No. | Dose (g/l) | Contact time (min) | Initial concentration of As mg/l | Final concentration of As mg/l | % Removal |
|---|---|---|---|---|---|
| 1 | 4.0 | 10 | 10.0 | 4.78 | 25.2 |
| 2 | 8.0 | 10 | 10.0 | 5.62 | 43.8 |
| 3 | 12.0 | 10 | 10.0 | 3.57 | 64.3 |
| 4 | 16.0 | 10 | 10.0 | 2.48 | 75.2 |
| 5 | 20.0 | 10 | 10.0 | 1.26 | 87.4 |

EXAMPLE 4b

The same procedure was repeated described as in example 4 except for initial concentration of arsenic solution wherein the concentration employed was 25 mg/l. The results are detailed in Table 4b.

TABLE 4b

Removal of $CrO_4^{2-}$ at fixed initial concentration and at variable SMZ dose

| S. No. | Dose (g/l) | Contact time (min) | Initial Concentration of As mg/l | Final Concentration of As mg/l | % Removal |
|---|---|---|---|---|---|
| 1 | 4.0 | 10 | 25.0 | 19.25 | 23.00 |
| 2 | 8.0 | 10 | 25.0 | 14.91 | 40.36 |
| 3 | 12.0 | 10 | 25.0 | 10.76 | 56.96 |
| 4 | 16.0 | 10 | 25.0 | 04.48 | 82.08 |
| 5 | 20.0 | 10 | 25.0 | 03.68 | 92.08 |

EXAMPLE 5

The same procedure was repeated as described in example 1 for preparation of SMZ wherein commercial zeolite-A was treated with surfactant concentration of 200 mg/l. The as-synthesized sample was further treated with 0.2 M solution of $FeSO_4$ to obtain the surfactant and metal treated SMZ designated as SMZ-A-25. The as-synthesized samples were used to study the removal of arsenic at fixed initial concentration of 1 mg/l. The results are detailed in Table 5.

TABLE 5

Surfactant and Metal Treated Zeolites (Hybrid material) (HDTMA-Br) Contact Time: 5 min Dose: 2 g/l

| Sample | Surfactant treatment (mg/l)* | Metal treatment (M)** | Initial concentration of As (mg/l) | Final concentration of As (mg/l) | % Removal |
|---|---|---|---|---|---|
| SMZ-A-2 | 200 | Nil | 1.0 | 0.534 | 46.6 |
| SMZ-A-6 | 1000 | Nil | 1.0 | 0.414 | 58.6 |
| SMZ-A-10 | 2000 | Nil | 1.0 | 0.346 | 65.4 |
| SMZ-A-25 | 200 | 0.2 | 1.0 | 0.024 | 97.6 |
| SMZ-A-26 | 1000 | 0.2 | 1.0 | N.D. | 100 |
| SMZ-A-27 | 2000 | 0.2 | 1.0 | N.D. | 100 |

N.D.: Non Detectable
*Initial surfactant concentration used for treatment
**Initial metal concentration used for treatment

EXAMPLE 5a

The same procedure was repeated as described in example 5 except for variation in treatment with surfactant wherein the concentration employed was 1000 mg/l. The sample was designated as SMZ-A-26. The as-synthesised sample was used for adsorption of arsenic. The efficiencies of samples are illustrated in Table 5.

EXAMPLE 5b

The same procedure was repeated as described in example 5 except for variation in treatment with surfactant wherein the concentration employed was 2000 mg/l. The sample was designated as SMZ-A-27. The as synthesised sample was used for adsorption of arsenic. The efficiencies of samples are illustrated in Table 5.

EXAMPLE 6

The same procedure was repeated as described in example 1 for preparation of SMZ wherein commercial zeolite-A was treated with surfactant concentration of 200 mg/l. The as-synthesized sample was further treated with 0.2 M solution of FeSO$_4$ to obtain the surfactant and metal treated SMZ designated as SMZ-A-28. The as-synthesized samples were used to study the removal of arsenic at fixed initial concentration of 1 mg/l. The results are detailed in Table 6.

TABLE 6

Surfactant and Metal Treated Zeolites (Hybrid material) (TBA-Br)
Contact Time: 5 min Dose: 2 g/l

| Sample | Surfactant treatment (mg/l)* | Metal treatment (M)** | Initial concentration of As (mg/l) | Final concentration of As (mg/l) | % Removal |
|---|---|---|---|---|---|
| SMZ-A-2 | 200 | Nil | 1.0 | 0.236 | 76.4 |
| SMZ-A-6 | 1000 | Nil | 1.0 | 0.380 | 61.96 |
| SMZ-A-10 | 2000 | Nil | 1.0 | 0.372 | 62.8 |
| SMZ-A-28 | 200 | 0.2 | 1.0 | 0.006 | 99.4 |
| SMZ-A-29 | 1000 | 0.2 | 1.0 | 0.004 | 99.6 |
| SMZ-A-30 | 2000 | 0.2 | 1.0 | N.D. | 100 |

N.D.: Non Detectable
*Initial surfactant concentration used for treatment
**Initial metal concentration used for treatment EXAMPLE 6a The same procedure was repeated as described in example 6 except for variation in treatment with surfactant wherein the concentration employed was 1000 mg/l. The sample was designated as SMZ-A-29. The as-synthesised sample was used for adsorption of arsenic. The efficiencies of samples are illustrated in Table 6.

EXAMPLE 6b

The same procedure was repeated as described in example 6 except for variation in treatment with surfactant wherein the concentration employed was 2000 mg/l. The sample was designated as SMZ-A-30. The as-synthesised sample was used for adsorption of arsenic. The efficiencies of samples are illustrated in Table 6.

EXAMPLE 7

Zeolite-A was washed with distilled water several times till its filtrate pH reaches to 10.0 to 10.5. 10 g of washed zeolite A sample was then mixed with 0.2 M solution of ferrous sulphate. The solution was agitated for 7 to 8 hr at 150 rpm on shaker. The solution was then filtered and the solid residue was washed with double distilled water and air dried for 6 hr. The iron treated zeolite samples as synthesized was given the same treatment as detailed in example 1 to obtain the metal and surfactant treated SMZ designated as SMZ-A-31. SMZ-A-32 and SMZ-A-33 were synthesised by treating iron zeolite-A with surfactant concentrations of 1000 mg/l and 2000 mg/l. The as-synthesized samples were used to study the removal of arsenic at fixed initial concentration of 1 mg/l. The results are detailed in Table 7.

TABLE 7

Metal and HDTMA-Br treated zeolites
Contact Time: 5 min Dose: 2 g/l

| Sample | Metal treatment (M)* | Surfactant treatment (mg/l)** | Initial concentration As (mg/l) | Final concentration of of As (mg/l) | % Removal |
|---|---|---|---|---|---|
| SMZ-A-2 | Nil | 200 | 1.0 | 0.534 | 46.6 |
| SMZ-A-6 | Nil | 1000 | 1.0 | 0.414 | 58.6 |
| SMZ-A-10 | Nil | 2000 | 1.0 | 0.398 | 65.4 |
| SMZ-A-31 | 0.2 | 200 | 1.0 | N.D. | 100 |
| SMZ-A-32 | 0.2 | 1000 | 1.0 | N.D. | 100 |
| SMZ-A-33 | 0.2 | 2000 | 1.0 | N.D. | 100 |

N.D.: Non Detectable
*Initial surfactant concentration used for treatment
**Initial metal concentration used for treatment

EXAMPLE 8

The same procedure was repeated as described in example 7 except for treatment with tetrabutyl ammonium hydroxide (TBAOH) as surface modifiers. The TBAOH concentration used was 200 mg/l and the sample was designated as SMZ-A-34. SMZ-A-35 and SMZ-A-36 were synthesized by treating zeolite-A with TBAOH concentration of 1000 mg/l and 2000 mg/l. The as-synthesised samples were used for adsorption of arsenic. The efficiencies of samples are illustrated in Table 8.

TABLE 8

Metal and TBAOH treated zeolites
Contact Time: 5 min Dose: 2 g/l

| Sample | Metal treatment (M)* | Surfactant treatment (mg/l)** | Initial concentration of As (mg/l) | Final concentration of As (mg/l) | % Removal |
|---|---|---|---|---|---|
| SMZ-A-14 | Nil | 200 | 1.0 | 0.236 | 76.4 |
| SMZ-A-18 | Nil | 1000 | 1.0 | 0.380 | 61.96 |
| SMZ-A-22 | Nil | 2000 | 1.0 | 0.372 | 62.8 |
| SMZ-A-34 | 0.2 | 200 | 1.0 | N.D. | 100 |
| SMZ-A-35 | 0.2 | 1000 | 1.0 | N.D. | 100 |
| SMZ-A-36 | 0.2 | 2000 | 1.0 | N.D. | 100 |

N.D.: Non Detectable
*Initial surfactant concentration used for treatment
**Initial metal concentration used for treatment

EXAMPLE 9

Zeolite-A was washed with distilled water several times till its filtrate pH reaches to 10.0 to 10.5. 1 g of washed zeolite A sample was then mixed with an alcoholic solution of 2,3-dimercapto-1-propanesulphonic acid (DMSA). The concentration of DMSA used was 3000 mg/l. The solution was agitated for 4 to 5 hr at 150 rpm on shaker. The solution was then filtered and the solid residue was washed with double distilled water and air dried for 6 hrs. The sample synthesized as such was then mechanically ground with a mortar and pestle to fine particle size. The sample was designated as SMZ-A-37. SMZ-A-38 and SMZ-A-39 were synthesized by treating zeolite-A with DMSA concentration of 6000 mg/l and 9000 mg/l. The as-synthesised samples were used for adsorption of arsenic. The efficiencies of samples are illustrated in Table 9.

TABLE 9

DMSA treated zeolite-A for arsenic removal
Contact time: 5 min Dose: 5 g/l

| S. No. | Sample | DMSA treatment mg/g of zeolite | Initial concentration of As (mg/l) | Final concentration of As (mg/l) | % Removal |
|---|---|---|---|---|---|
| 1 | SMZ-A-37 | 30 | 1.0 | 0.06 | 93.2 |
| 2 | SMZ-A-38 | 60 | 1.0 | 0.11 | 89 |
| 3 | SMZ-A-39 | 90 | 1.0 | 0.1 | 90 |

EXAMPLE 10

The same procedure was repeated as described in example 12 except for the ligand wherein the DMSA was replaced with 2,3-dimercapto-1-propanol (DMPA). The sample was designated as SMZ-A-40. SMZ-A-41 and SMZ-A-42 were synthesized by treating zeolite-A with DMPA concentration of 6000 mg/l and 9000 mg/l. The as synthesised samples were used for adsorption of arsenic. The efficiencies of samples are illustrated in Table 10.

TABLE 10

DMPA treated zeolite-A for arsenic removal
Contact time: 5 min Dose: 5 g/l

| S. No. | Sample | DMSA treatment mg/g of zeolite | Initial concentration of As (mg/l) | Final concentration of As (mg/l) | % Removal |
|---|---|---|---|---|---|
| 1 | SMZ-A-40 | 30 | 1.0 | 0.06 | 89.9 |
| 2 | SMZ-A-41 | 60 | 1.0 | 0.11 | 89.8 |
| 3 | SMZ-A-42 | 90 | 1.0 | 0.10 | 89.8 |

ADVANTAGES

The main advantages of the present invention are:

Offers selectivity over conventional adsorbents for arsenic at low concentrations Offers versatility over conventional adsorbents for sorption of wide range of pollutants ranging from cationic to anionic High adsorption capacity over conventional adsorbents Possible frequent regeneration and disposal by virtue of its conversion to value added ceramic precursors by heat treatment Stabilization/immobilisation of arsenic in SMZ at higher temperature.

Offers cost-effectiveness over other adsorbents by offering single unit for wide array of pollutants/chemical species vis-à-vis multiple units required for targeting wide array of pollutants/chemical species.

No problem of sludge generation which are generally associated with conventional chemical methods viz. alum treatment, chemical precipitation etc.

No problem of hazardous chemical handling etc. by providing technically non-tedious and clean process.

The invention claimed is:

1. A surface-modified zeolite comprising:
a) a zeolite selected from the group consisting of zeolite A, zeolite X, flyash based zeolite, and faujasitic zeolite of Y type;
b) a modifier selected from the group consisting of surfactants and a metal chelating ligand selected from the group consisting of dimercaptosuccinic acid (DMSA) and dimercaptopropionic acid; and
c) iron
wherein the ratio of zeolite:modifier in said modified zeolite ranges from 1:0.003 to 1:0.045 and the ratio of zeolite to iron ranges from 1:0.25 to 1:25.

2. The surface-modified zeolite as claimed in claim 1, wherein said surfactant is selected from the group consisting of hexadecyltrimethyl ammonium bromide (HDTMA-Br), sodium lauryl sulphate, tetrapropoylammonium bromide (TPA-Br), tetrabutylammonium bromide (TBA-Br), tetramethylammonium bromide (TMA-Br), and tetrabutylammonium hydroxide (TBA-OH).

3. The surface-modified zeolite as claimed in claim 1, wherein said surface-modified zeolite has the following characteristics:
Calcium binding capacity: 400 meq/ 100 g
Surface area: 500 $m^2/g$
Crystallinity: 90-92%
Cubic crystal structure
$d_{50}$ average particle size of 4-10μ.

4. A process for the synthesis of a surface-modified zeolite of claim 1 useful for sequestration of anions, wherein the said process comprises the steps of:
a) washing a zeolite selected from the group consisting of zeolite A, zeolite X, flyash based zeolite, and faujasitic zeolite of Y type with distilled water followed by modification using a modifier selected from the group consisting of surfactants and metal chelating ligands by mixing and stirring of the zeolite and modifier for 6-8 hr at pH 6.0 to pH 11.0;
b) filtering and washing the product obtained from step (a);
c) drying the product obtained from step (b) at 90-100°C. for 2-3 hr to obtain surface-modified zeolite; and
d) filtering the surface-modified zeolite obtained from step (c) to get surface-modified zeolite crystals or subjecting the surface-modified zeolite to treatment with iron to get surface-modified zeolite crystals.

5. The process as claimed in claim 4, wherein surface-modified zeolite has the following characteristics:
Calcium binding capacity: 400 meq/ 100 g
Surface area: 500 $m^2/g$
Crystallinity: 90-92%
Cubic crystal structure
$d_{50}$ average particle size of 4-10μ.

6. The process as claimed in claim 4, wherein said surfactant is selected from the group consisting of hexadecyltrimethyl ammonium bromide (HDTMA-Br), sodium lauryl sulphate, tetrapropoylammonium bromide (TPA-Br), tetrabutylammonium bromide (TBA-Br), tetramethylammonium bromide (TMA-Br), and tetrabutylammonium hydroxide (TBA-OH).

7. The process as claimed in claim 4, wherein the concentration of the modifier used is in the range from 200 mg/l to 2,000 mg/l.

8. The process as claimed in claim 4, comprising treatment with iron, wherein the treatment with iron is carried out by contacting the surface-modified zeolite with ferrous sulphate solution at a concentration range from 0.1 to 1.0M.

9. A method for removal of anionic pollutants from water using surface-modified zeolite and recovery of the said surface-modified zeolite, wherein said method comprising the steps of:
a) contacting anionic pollutants contained in water with surface-modified zeolite as claimed in claim 1 for up to 10 minutes whereby said anionic pollutants are sorbed on said surface-modified zeolite;

b) subjecting the surface-modified zeolite comprising sorbed anionic pollutants obtained from step (a) to high temperature treatment at 700-800 degrees C. for its conversion into ceramic precursors or optionally recovering the surface-modified zeolite by contacting it with caustic soda solution.

10. The process as claimed in claim 9, wherein said water is simulated water containing anionic pollutants prepared by dissolving a sodium salt of arsenate and chromate in water.

11. The process as claimed in claim 9, wherein the said pollutants are selected from the group consisting of chromate, arsenate and selenate.

12. The process as claimed in claim 9, wherein the concentration of said pollutants is in the range of 1-150 mg/l.

13. The process as claimed in claim 9, wherein the surface-modified zeolite used for the removal of said pollutants is in the range of 0.2 g/ml-125 g/25 ml.

14. The process as claimed in claim 9, wherein the surface-modified zeolite is recovered by contacting it with 0.1-1.0 M caustic soda solution.

* * * * *